US010757366B1

(12) United States Patent
Kwatra et al.

(10) Patent No.: US 10,757,366 B1
(45) Date of Patent: Aug. 25, 2020

(54) VIDEOCONFERENCING DYNAMIC HOST CONTROLLER

(71) Applicant: INTERNATIONAL BUSINESS MACHINES CORPORATION, Armonk, NY (US)

(72) Inventors: Shikhar Kwatra, Durham, NC (US); Michael Bender, Rye Brook, NY (US); Craig M. Trim, Ventura, CA (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/373,757

(22) Filed: Apr. 3, 2019

(51) Int. Cl.
*H04N 7/15* (2006.01)
*H04L 29/08* (2006.01)
*G06F 11/34* (2006.01)
*G06F 11/30* (2006.01)

(52) U.S. Cl.
CPC ......... *H04N 7/152* (2013.01); *G06F 11/3062* (2013.01); *G06F 11/3423* (2013.01); *H04L 67/1051* (2013.01); *H04L 67/322* (2013.01)

(58) Field of Classification Search
USPC ...................................................... 348/14.08
See application file for complete search history.

(56) References Cited

U.S. PATENT DOCUMENTS

| 4,574,374 | A | 3/1986 | Scordo |
| 8,626,847 | B2 | 1/2014 | Jones et al. |
| 8,917,590 | B2 | 12/2014 | Cazanas et al. |
| 9,774,746 | B1 | 9/2017 | Sennett et al. |
| 2005/0132000 | A1 | 6/2005 | Richardson et al. |
| 2013/0163739 | A1* | 6/2013 | Cazanas ............... H04M 3/563 379/202.01 |
| 2013/0342637 | A1* | 12/2013 | Felkai ...................... H04N 7/14 348/14.08 |
| 2016/0094355 | A1 | 3/2016 | Waltermann et al. |
| 2016/0173821 | A1* | 6/2016 | De Magalhaes ......... H04N 7/15 348/14.08 |

OTHER PUBLICATIONS

Peter Mell et al, The NIST Definition of Cloud Computing, National Institute of Standards and Technology, Publication 800-145, 2011, entire document.

* cited by examiner

*Primary Examiner* — Amal S Zenati
(74) *Attorney, Agent, or Firm* — Patrick J. Daugherty; Daugherty & Del Zoppo Co., LPA

(57) ABSTRACT

Aspects of the present invention generate a vector value representing a state of a host device hosting a videoconference that is attended by a plurality of participant videoconference devices, wherein the host device controls audio and video distributed for the videoconference to others of the participant videoconference devices, evaluate the vector value to determine a change in the vector value during the videoconference, identify a plurality of second host devices of the plurality of participant videoconference devices that are each enabled to control the audio and video distributed for the videoconference to others of the participant videoconference devices, and in response to determining that the change in the vector value exceeds a threshold, switch control of the videoconference from the host device to one of the second host devices.

17 Claims, 5 Drawing Sheets

VIDEOCONFERENCING DYNAMIC HOST CONTROLLER

TECHNICAL FIELD

The present invention relates generally to a method, system, and computer program product for a networked, programmable device. More particularly, the present invention relates to a method, system, and computer program product for videoconferencing dynamic host control.

BACKGROUND

Videoconferencing is the reception and transmission of audio-video signals by devices of users at different locations over a network in real-time. A videoconference can be scheduled for the users through a calendar application, such as with an electronic meeting invite. A host or user participating in the video conference electronically controls presentation of visuals and audio, which are transmitted to devices of other users participating in the videoconference. For example, a host device controls video that is typically presented on the host device to the host, such as video captured from a camera, video output of a program running from the host device, video image of the desktop, video of visuals from a slide show, etc. The host device controls input of audio, such as input from a microphone connected to the host device. The video and audio can be transmitted as a composite packet over a network to the devices of the videoconferencing participants and the video is presented on a corresponding window in a display and the audio presented in a speaker of the devices of the videoconferencing participants.

A videoconferencing server acts to receive the video and audio packets from the host device and/or host controlled devices. The videoconferencing server can stream the audio and video to the devices of the participants of the videoconference, such as with Broadcast, Unknown unicast and Multicast (BUM) packets. The videoconferencing server can identify the devices of the participants of the videoconference by relating the participants to the devices of the videoconference, such as relating a logon or user identifier of the participant to the participant device.

BRIEF SUMMARY

In one aspect of the present invention, a computer-implemented method for videoconferencing dynamic host control includes executing a computer processor generating a vector value representing a state of a host device hosting a videoconference that is attended by a plurality of participant videoconference devices, wherein the host device controls audio and video distributed for the videoconference to others of the participant videoconference devices, evaluating the vector value to determine a change in the vector value during the videoconference, identifying a plurality of second host devices of the plurality of participant videoconference devices that are each enabled to control the audio and video distributed for the videoconference to others of the participant videoconference devices, and in response to determining that the change in the vector value exceeds a threshold, switching control of the videoconference from the host device to one of the second host devices.

In another aspect, a system has a hardware computer processor, computer readable memory in circuit communication with the computer processor, and a computer-readable storage medium in circuit communication with the computer processor and having program instructions stored thereon. The computer processor executes the program instructions stored on the computer-readable storage medium via the computer readable memory and thereby dynamically controls a videoconferencing host, which generates a vector value representing a state of a host device hosting a videoconference that is attended by a plurality of participant videoconference devices, wherein the host device controls audio and video distributed for the videoconference to others of the participant videoconference devices, evaluates the vector value to determine a change in the vector value during the videoconference, identifies a plurality of second host devices of the plurality of participant videoconference devices that are each enabled to control the audio and video distributed for the videoconference to others of the participant videoconference devices, and in response to determining that the change in the vector value exceeds a threshold, switches control of the videoconference from the host device to one of the second host devices.

In another aspect, a computer program product for videoconferencing dynamic host control has a computer-readable storage medium with computer readable program code embodied therewith. The computer readable program code includes instructions for execution by a computer processor that cause the computer processor to generate a vector value representing a state of a host device hosting a videoconference that is attended by a plurality of participant videoconference devices, wherein the host device controls audio and video distributed for the videoconference to others of the participant videoconference devices, evaluate the vector value to determine a change in the vector value during the videoconference, identify a plurality of second host devices of the plurality of participant videoconference devices that are each enabled to control the audio and video distributed for the videoconference to others of the participant videoconference devices, and in response to determining that the change in the vector value exceeds a threshold, switch control of the videoconference from the host device to one of the second host devices.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
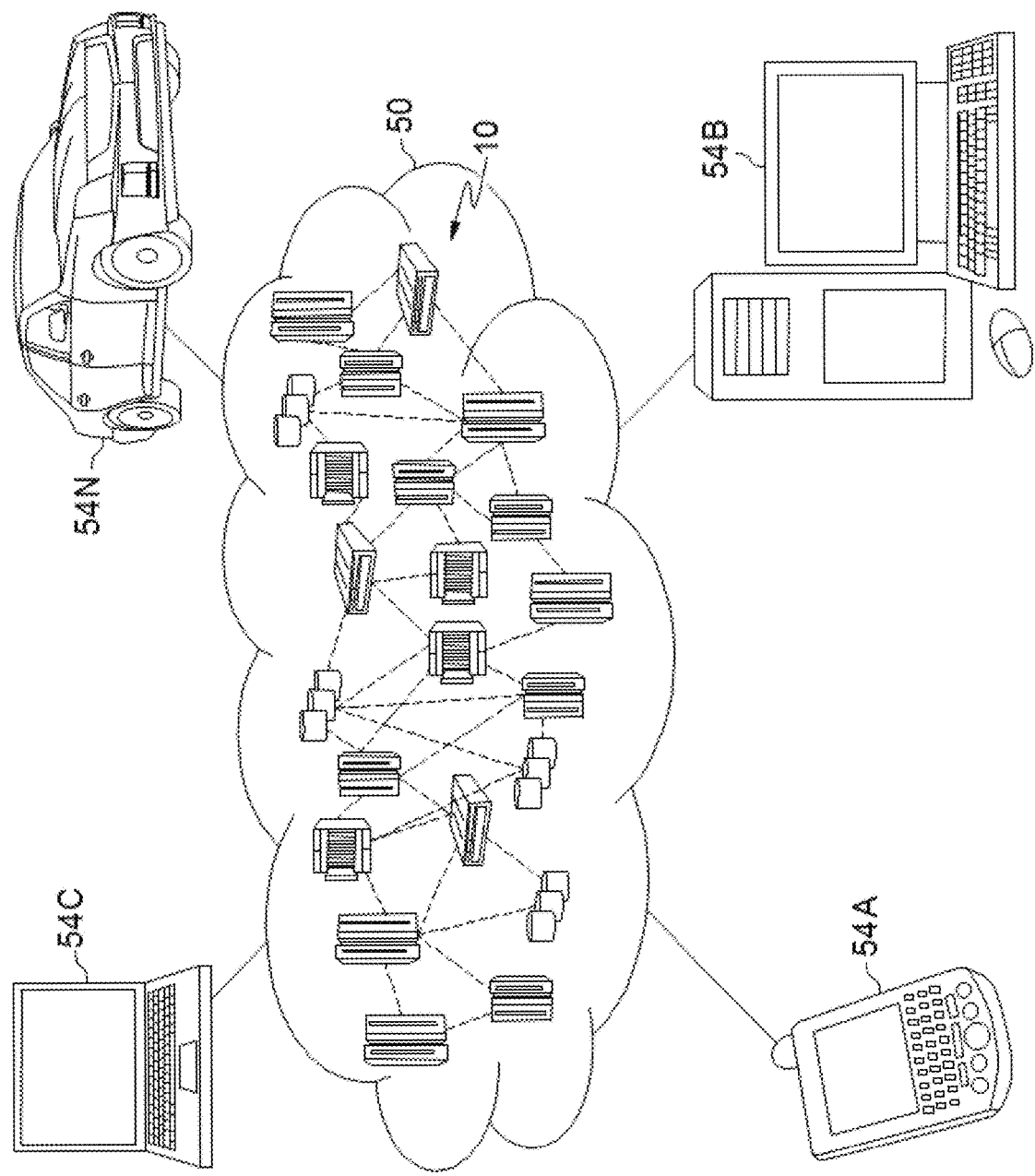
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
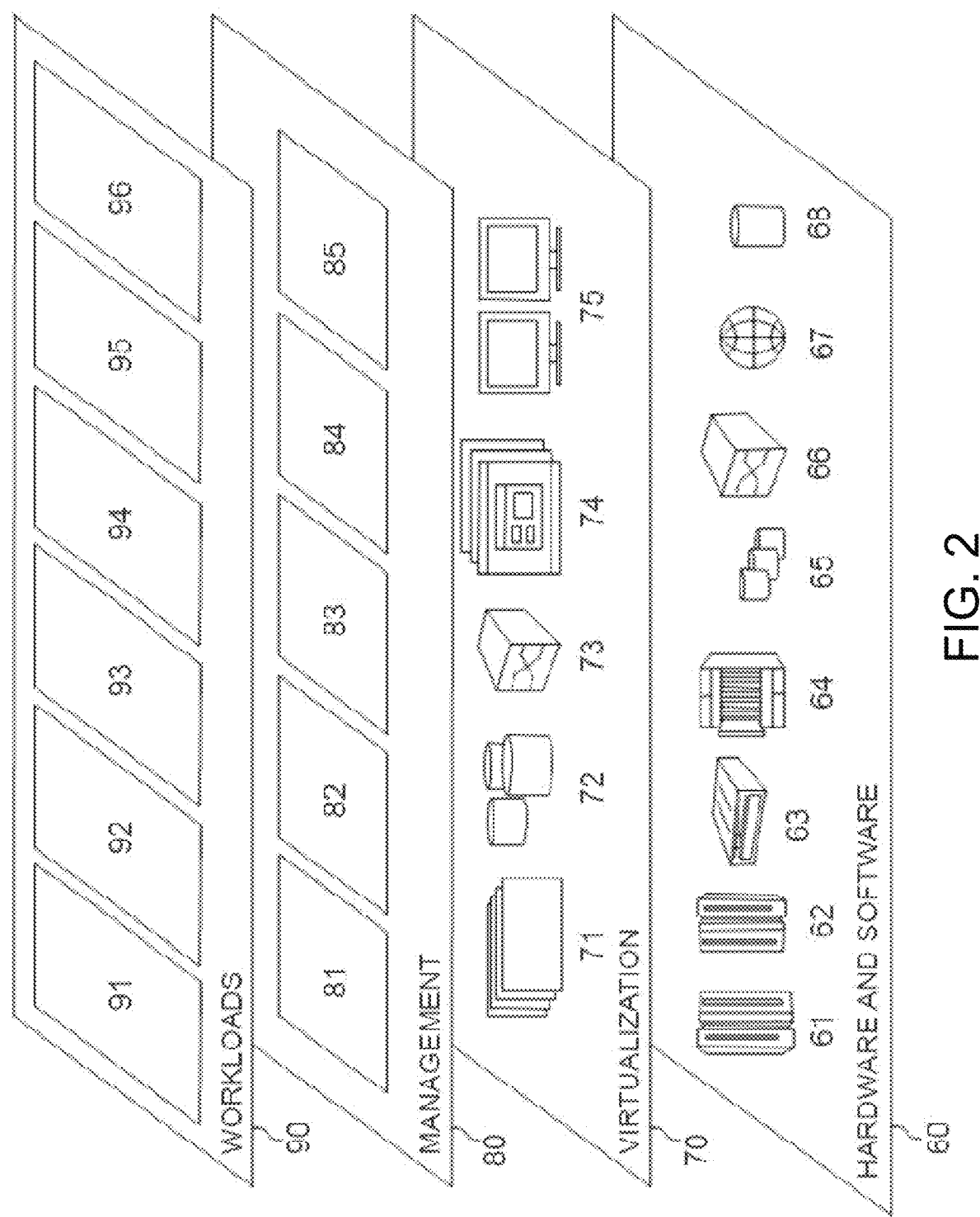
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for videoconferencing dynamic host control 96.

Figure 3:
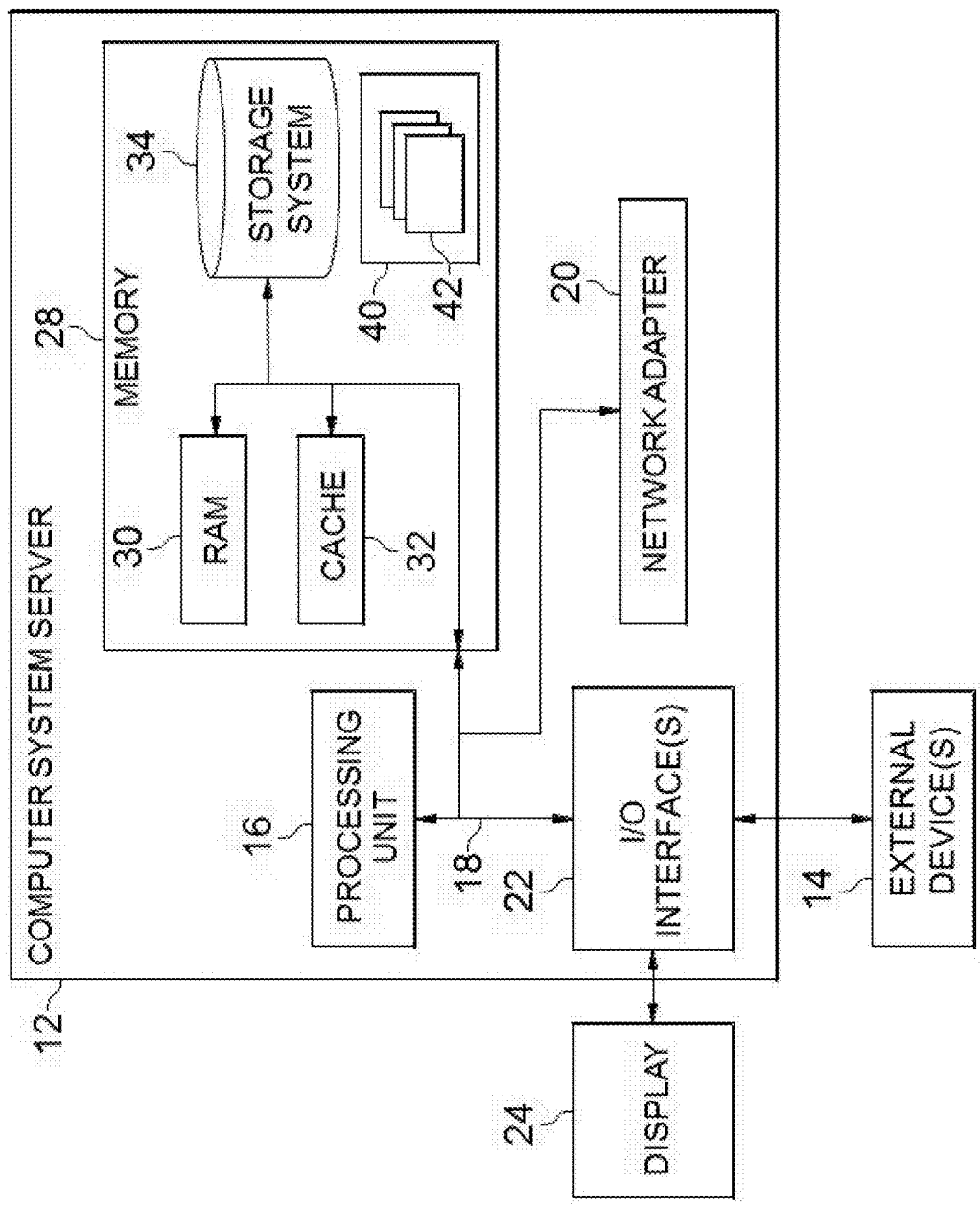
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
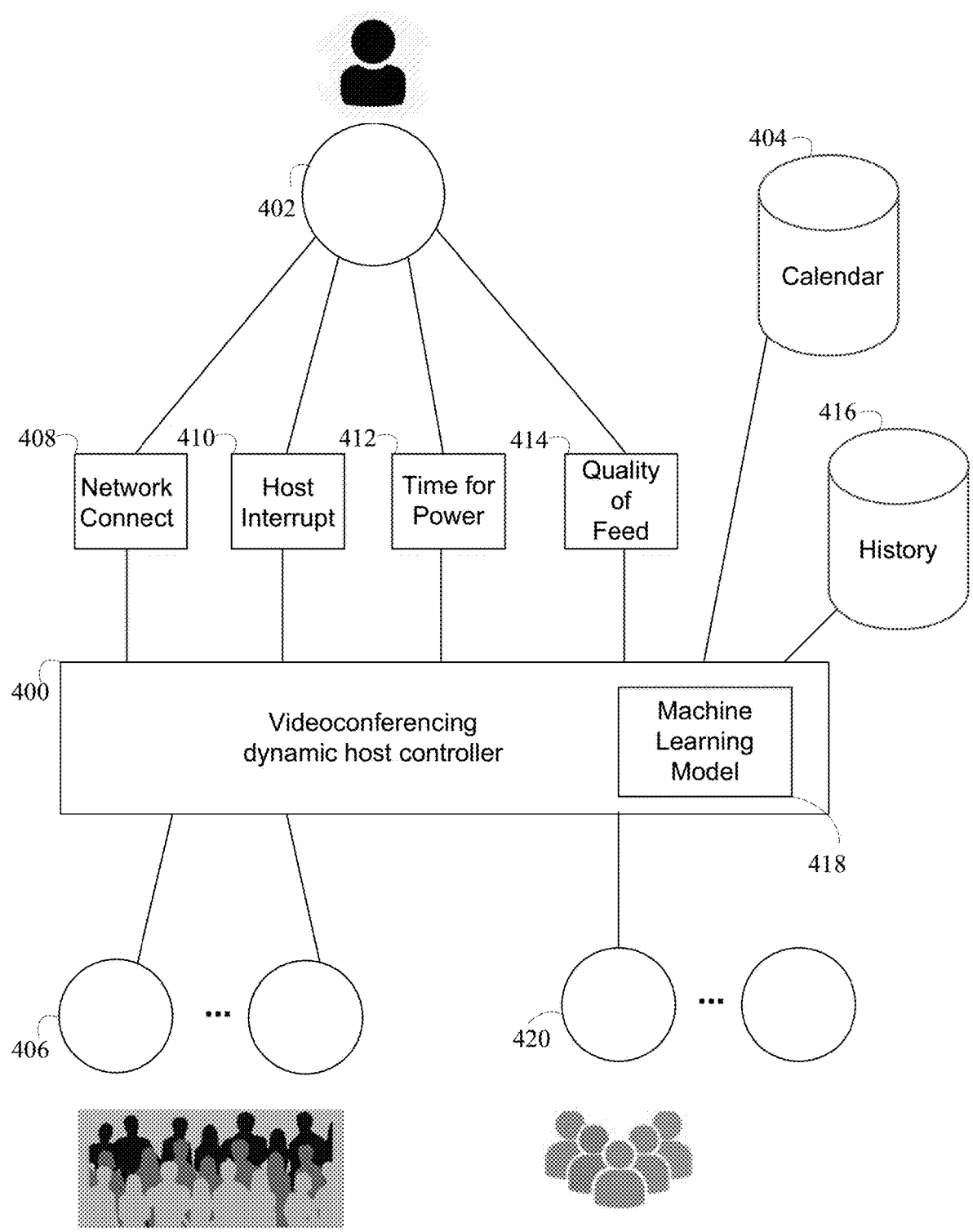
FIG. 4 depicts an example schematic illustration of an embodiment of the present invention.

FIG. 4 schematically illustrates an example according to the present invention for videoconferencing dynamic host control. A videoconferencing dynamic host controller 400 identifies a host device 402 for a videoconference. For example, a user, a person hosting the videoconference (or host), of the host device 402 schedules a videoconference in a calendar 404 of videoconferences and the host is recorded according to a user identifier. The scheduling of the videoconference in the calendar 404 can include attributes of the videoconference, such as a start time and date, a duration time, an end time and date, and combinations thereof. For example, the videoconference schedule begins at a time to and ends at a time to. The calendar 404 is suitably embodied by another node 10 in the cloud 50, the computer system server 12, and combinations thereof.

The host device 402 controls the transmission of video and audio to the videoconferencing dynamic host controller 400 during the videoconference. The host device 402, such as the local computing device 54, includes input/output devices, such as a display device, an audio input device, and a host control input device. For example, the host device 402 displays a first window on the display device which includes controls for conducting the videoconference, and a second window on the display device which displays the video output for the videoconference that is transmitted to the videoconferencing dynamic host controller 400. The first window includes controls that determine what is included in the video output, such as camera input, output from another program, input from another node 10, and combinations thereof. In some embodiments, the first and second window are combined into a single window incorporating aspects of both windows into the single window on the host device 402. The audio input device can include a microphone which inputs audio of the host, such as voice, or other audio captured from a program on the host device 402, audio input from another node 10 in the cloud, and combinations thereof.

The videoconferencing dynamic host controller 400 receives the transmitted audio and video from the host device 402 and distributes the audio and video to devices of participants 406 through the cloud 50. The devices of participants 406 can be identified by the videoconferencing dynamic host controller 400 by association to the videoconference, such as through entries in the calendar 404, access codes entered to participate in the videoconference, user identifiers used to register for the conference or access the videoconference, email addresses used to access the videoconference, Internet Protocol (IP) addresses of devices connected to the videoconference, a media access control (MAC) address of devices connected to the videoconference and combinations thereof. For example, participants enter an email address and a participant code to participate in the videoconference. The videoconferencing dynamic host controller 400 identifies the device of the participant 406 upon entry of the email address and the participant code.

A first monitor 408 generates a value measuring network connectivity of the host device 402 with the videoconferencing dynamic host controller 400 during the videoconference. The value, N, can include network speed, network throughput, and combinations thereof. For example, a ping Internet Protocol (IP) address uses Internet Control Message Protocol (ICMP) Echo function as detailed in RFC 792 to send a small packet through the cloud to an IP address. Network speed and/or throughput can be determined by the configured processor based on the Echo or return packet. In some instances, network speed and/or throughput below a threshold can degrade the quality of the videoconference.

A second monitor 410 generates a value measuring host interruption during the videoconference. In some instances, a number of interruptions greater than a threshold such as notifications displayed on the display of the host device 402 or alerts sounded by an audio output device of the host device 402 can diminish the quality of the presentation by the host. The value, S, measuring host interruptions can include statistics of notification or alerts, such as frequency counts, a mean, a maximum, a medium, a minimum, measures of variance, measures of change in frequency and combinations thereof. In some embodiments, the second monitor 410 increments a counter in response to each display notice or sounded alert. In some embodiments, the type of notification or alert can be filtered in the set of values to exclude specific types of alerts or notifications, include only specific types of alerts or notifications, and combinations thereof.

A third monitor 412 generates a value measuring estimated time remaining before a power level of the host device 402 is insufficient to control the audio and video transmitted by the host device 402 during the videoconference to the videoconferencing dynamic host controller 400 to distribute to the devices of the participants 406. The estimated time remaining of power for the host device 402, P, is based on power supply and power consumption by the host device 402, and represents a time, $t_p$, that the host device 402 can continue as the host device 402. For example, a host device has a power supply of only a battery power, initially measured at 0.2 milliamp hours (mAh), and the host device is consuming power at 0.02 mAh each minute and the third monitor 412 generates a value of 10 minutes as the value of the estimated time remaining of power for the host device 402 to host the videoconference.

The power supply can include battery supply, electrical supply and combinations thereof. The power supply can be measured at a point in time or measured as a function computed over sampled points in time. For example, the power supply can include a time value curve for battery consumption, which may be linear or non-linear, and the power supply computed from the time value curve.

The power consumption can include the rate of power consumption by the host device 402 with components configured as part of the host device 402. In some embodiments, the power consumption includes estimates based on a videoconferencing configuration. For example, a laptop power consumption prior to the start of the videoconferencing is determined based on power consumption by a processor component, a display component, a keyboard component, and a network interface card (NIC) component. The rates of power consumption by the individual components can change during the videoconferencing, such as due to the production and transmission of BUM packets from the host device 402, which changes rates of the processor, display, and NIC components. The videoconferencing configuration can be determined from a history of the host device 402, from a model according to the component configuration of the host device 402, and combinations thereof. For example, the host device with a processor of type X, a display of type Y, and an NIC of type Z, a lookup table can provide the value of the estimated time remaining of power based on other host devices with type X, Y and Z components.

The value the estimated time remaining of power, P, can include probabilistic estimates, such as based on curves fitted to differences between the power supply and the power consumption, functions of the power supply, power consumption and the scheduled end of the videoconference. In some embodiments, multiple time values can be generated based on confidence levels. For example, an estimated time remaining of power is 10 minutes and a 95% confidence level generates time estimates of 8 minutes and 12 minutes. The value can be displayed on the host device 402.

A fourth monitor 414 generates a quality metric of the video and audio transmitted by the host device 402 for the videoconference. The quality metric can measure signal loss of the video, the audio and combinations thereof. For example, the quality metric can include indirect measures of signal loss such as packet loss between the host device 402 and the videoconferencing dynamic host controller 400 measured by the ping from the first monitor 408. In some instances, packet loss has the effect of video degradation, video interruption, audio degradation, audio loss, and combinations thereof. The quality metric can be determined from examination of the video by a model inspection of images frame by frame, such as a peak signal-to-noise ratio (PSNR) model, structural similarity (SSIM) model, or other image quality model. The value can be determined from examination of the audio by a model, such as a signal-to-noise ratio (SNR) model. The quality metric of the video and audio, Q, can include a composite value, a quality measure of each of the video and the audio, individual measures of different aspects of the video and the audio, and combinations thereof.

The videoconferencing dynamic host controller 400 receives the monitored values and generates a vector $V_i$ value representing a state of the host device 402 at a time $t_i$, where $t_0 \leq t_i \leq t_n$ and $t_0$ is the scheduled start of the videoconference and $t_n$ is the scheduled end of the videoconference. In some embodiments, $t_0$ and/or $t_n$ can include a padding factor in which the vector is generated a predetermined time before the scheduled start of the videoconference, and/or is generated for a predetermined time after the scheduled end time. The generated vector value $V_i$ can include the values for the host network connectivity, the host interruptions, the estimated time remaining of power, the quality metric of the video and audio, the history 416 of the host device 402 as a host device, and combinations thereof.

The history 416, H, of the host device 402 includes a value that represents the history of the host device 402, such as an indicator of change in hosting or no change in hosting of a prior hosting, a relative time to change in hosting of the prior hosting from the scheduled start of the videoconference, the vector value at the start of the videoconference of the prior hosting, the vector value at the time of change in hosting of a prior hosting, the vector value at the scheduled end time of the videoconference of a prior hosting, the vector value at the actual end time of the videoconference of the prior hosting, combinations thereof and the like. The hosting history can include hosting videoconferences according to the host, the host device, and combinations thereof.

The history 416 can include a value for each instance of hosting by the host device 402, statistics representing a combination of the instances of hosting by the host device 402, and combinations thereof. For example, the history 416 can include, for instances of no change in hosting, the vector value with an indicator of no change in host, and the values at a time of the end of a videoconference for the host network connectivity, the host interruptions, the estimated time remaining of power, and the quality metrics of the audio and video. The history 416 can include, for instances of a change in hosting, the vector with an indicator of a change in hosting, a time of the change in hosting relative to the scheduled start of the videoconference, and values at a time of the change in hosting for the host network connectivity, the host interruptions, the estimated time remaining of power, and the quality metrics of the video and audio.

In another example, the history 416 includes statistical values for the host device 402 of a frequency count of hosting a prior videoconference, a frequency count in a change in the hosting during prior videoconferences, an average time to the hosting change, a frequency count of the host device network connectivity below a threshold, a frequency count of the host interruptions exceeding a threshold, a frequency count of the estimated time remaining below a threshold, and a frequency count of the quality metric of the video and audio below a threshold.

In another example, the history 416 includes statistical values for the host that includes values for all hosting devices used by the host according to the user identification, which includes a frequency count of hosting a prior videoconference, a frequency count in a change in the hosting of a prior videoconference, an average time to the hosting change, a frequency count of the host devices used by the host with the network connectivity below a threshold, a frequency count of the host interruptions of host devices used by the host exceeding a threshold, a frequency count of the estimated time remaining of hosting devices used by the host below a threshold, and a frequency count of the quality metric of video and audio of hosting devices used by the host below a threshold.

The vector value is generated from the monitored data and can include the history 416. For example, the configured processor constructs a vector value, such as {N, S, P, Q, H}, where N is the value representing network connectivity between the host device 402 and the videoconferencing dynamic host controller 400, S is the value representing the interruptions of the host device 402, P is the value representing the estimated time remaining of power, Q is the value representing the quality metric of the video and audio transmitted from the host device 402 to the videoconferencing dynamic host controller 400, and H is the history 416 of the host device 402 and the history of the host. For example, values for N, S, P, Q represent the state of the hosting device at time t1 obtained from the monitored data for the host device 402, and H represents prior hostings by the host device 402 prior to the videoconference.

The videoconferencing dynamic host controller 400 uses a machine learning model 418 to evaluate the vector value and determine a change in the vector value indicative of changing host devices, such as exceeding a threshold. For example, the machine learning model 418 evaluates the vector value for a predetermined time interval $t_z \geq 0$ where the probability of a change in hosts exceeds a predetermined threshold. In some embodiments, the videoconferencing dynamic host controller 400 provides an estimate of the time remaining as a host to a determined change. In some embodiments, the host device 402 can send a command to the videoconferencing dynamic host controller 400 to change host devices. In some embodiments, the history 416 of the vector values is used to train the machine learning model 418. In some embodiments, the machine learning model 418 includes dynamic updates from the history 416, which iteratively adjust the machine learning model 418.

The machine learning model 418 can include a deep learning model, support vector machines, Bayesian networks, neural networks, linear regression models, long short term memory (LSTM), statistical classification, frequency estimation, hidden Markov models, Gaussian mixture models, pattern matching algorithms, matrix representation, vector quantization and decision trees, or combinations thereof, and the like, to input the vector values $V_i$ and $V2_i$, and combinations thereof; evaluate the received vector value; and output a probability of the host device 402 unable to remain as the host device, the list of second host devices 420, the ranked list of second host devices 420, the estimated time to switch the host device 402 to another host device, the selection from a plurality of the second host devices 420 as a new host device, and combinations thereof, wherein each of the second host devices have access to and are enabled to control or present the audio and video distributed for the videoconference to the other, participant videoconference devices. For example, each of the second host devices have network communication configurations, permissions and/or credentials to access storage media or cloud resources upon which the audio and video content distributed for the videoconference are stored or otherwise available.

In some instances, a basis for switching control from the host device 402 to another host device can include the network speed less than a predetermined threshold, the network throughput less than a predetermined threshold, the notices and/or alerts greater than a predetermined threshold, the estimated time of power remaining below a predetermined threshold, the signal loss of the video below a predetermined threshold, the signal loss of the audio below a predetermined threshold, the history of the hosting device changing to another hosting device above a predetermined threshold, the history of the host changing to another host above a predetermined threshold and combinations thereof. For example, the videoconferencing dynamic host controller 400 determines a change in host control based on the value for the audio quality metric below a predetermined threshold, e.g. the audio transmitted by the host device 402 has a lot of noise and the speech of the host can no longer be distinguished in the audio, no audio is received from the host device 402, etc. In another example, the videoconferencing dynamic host controller 400 determines a change in host device based on the estimated time remaining of power of the host device 402 determined as 10 seconds.

The videoconferencing dynamic host controller 400 can identify one or more second host devices 420 from the devices of the participants 406. In some embodiments, the videoconferencing dynamic host controller 400 can identify a plurality of second host devices 420. The videoconferencing dynamic host controller 400 can classify the devices of the participants 406 according to information entered by the respective participant to access the videoconference. The entered information, such as an access code entered to participate in the videoconference, a user identifier used to register for the conference or access the videoconference, an email address used to access the videoconference, can be inspected for similarity to a domain of the host that has network communication configurations, permissions and/or credentials to access the audio and video content distributed for the videoconference. In some embodiments, the videoconferencing dynamic host controller 400 can use additional information to classify the participants of the videoconference according to characteristics of their respective devices, such as access to a software program or component for generating the videoconference video and/or audio, an Internet Protocol (IP) address of the device accessing the videoconference, a Media Access Control (MAC) address, and the like.

For example, the host presents a new product offering in the videoconference to potential customers who connect to the videoconference using an email address and participant code. The videoconferencing dynamic host controller 400 inspects the email addresses entered by the participants of the videoconference for a host email address or email domain of each participant which is similar to a host email address as the current hosts, e.g. same email server as the email server of the identified host device 402.

The access codes can identify participants as host candidates and non-host candidates. For example, one access code can be used by one sub-group of participants, such as members of one organization and a different access code used by another sub-group of participants, such as members of a different organization. The access code can include encoding within the access code indicative of a domain similar to the host, i.e. those access codes with a similarity to the access code by the current host.

The user identifier of the participant can be used directly or indirectly to identify host candidates and non-host candidates. In some instances, the user identifier can include an encoding within the user identifier that directly identifies an organizational group of the participant. For example, a user identifier of the form XXXXYYYY where XXXX is an encoding of an organization, and YYYY is a specific person within the XXXX organization, can be inspected for domain similarity of the XXXX to the host. In some embodiments, the user identifier can be used indirectly to access profile information used by the videoconferencing dynamic host controller 400, which includes an identifier of an organization or domain of a respective participant.

The videoconferencing dynamic host controller 400 relates the entered information to current devices of the candidate hosts to identify the second host device 420. For example, the machine learning model 418 classifies participants A, B and C as candidate hosts because of a similarity of access codes, and the videoconferencing dynamic host controller 400 relates the respective devices of the participants A, B and C as the second host devices 406.

The videoconferencing dynamic host controller 400 can rank the second host devices 420 according to monitored data, the history 416 and combinations thereof. The ranking can include monitored data of the second host devices 420 by the first monitor 408, the second monitor 410, the third monitor 412, the fourth monitor 414, and combinations thereof. The monitoring of the second host device 420 can be the same or different than monitoring of the host device 402.

A second vector $V2_i$ value of the monitored second host device can be generated according to the monitoring and the history 416 and used by the machine learning model 418 to generate a ranked list of the second host devices 420 and associated participants. The history 416 includes history of the monitored second host device as a host device of videoconferences prior to the videoconference.

The generated ranked list can be transmitted to the host device 402 and displayed on a display of the host device 402. For example, the host device 402 displays a ranked list of the second host devices 420 and each instance of the ranked second host devices 420 includes the email address of the participant and the MAC address of the associated device. The ranked list can be updated periodically as a predetermined time or interval and the updated list transmitted to the host device 402.

For example, a host device of David is ranked lower as the second host device than Mike's because David's laptop has a history of a high frequency of interruptions causing change in hosting of prior videoconferences. During the current videoconference, the network connectivity of Mike's tablet is measured below a threshold speed, and the machine learning model 418 re-ranks the list placing David's laptop above Mike's tablet because of the poor network connectivity to Mike's tablet.

In response to the determined change in the vector value exceeding a threshold, the videoconferencing dynamic host controller 400 can change hosting to a new host device selected from the second host device 420. The selection can include a highest ranked second host device 420 from among a plurality of second host devices or a choice received from the host device 402 selected from among the plurality of second host devices. The selection of a new host device occurs at time j and the change in hosting occurs at time s where j≤s, and in some embodiments the selection is before the change in host devices j<s.

The videoconferencing dynamic host controller 400, the first monitor 408, the second monitor 410, the third monitor 412, and the forth monitor 414 are suitably embodied by one or more processors, a configured processor, such as the processing unit 16 of FIG. 3, which can be distributed across one or more nodes 10 in the cloud 50, distributed across the local computing device 54 incorporating the host device 402, and combinations thereof and configured to receive the transmitted audio and video from the host device 402, distribute the audio and video to the devices of participants 406 through the cloud 50, receive the monitored values and generate the vector value $V_i$ representing the state of the host device 402 at a time evaluate the vector value, determine the expected change in the host device 402 within a predetermined time interval $t_z \geq 0$, identify the second host device 420 from the devices of the participants 406, rank the second host devices 420, and change the hosting to a new host device selected from the second host device 420.

The present invention provides improvements over conventional host control. For example, conventional videoconferencing host control switches from a first designated host device to a second designated host device according to a signal such as a statement "John will present" or video captured hand gesture of another participant, input identifying another presenter using data captured from a schedule or agenda of the videoconference, or a next conference presenter. Conventional videoconferencing host control does not address situations of host operation other than complete operations or complete loss. For example, conventional videoconferencing does not address poor quality video and audio, host distractions, signal loss, etc., where the host device continues to operate but the videoconference received by the devices of the participants is deficient. The vector received by the videoconferencing dynamic host controller 400 allows for determining a degraded received videoconference and determining a change based on the conditions reflected in the received vectors.

Furthermore, conventional videoconferencing host control does not use a rate of change, such as power of the host device 402 in terms of time. In some instances, a threshold power of 10% in a host device can mean 30 minutes of videoconferencing while a threshold power of 10% in another host device can be 30 seconds of videoconferencing.

Additionally, conventional videoconferencing host control does not address selection of a new host based on operating characteristics of a device of the new host, history of the new host, history of the device of the new host, and combinations thereof.

Figure 5:
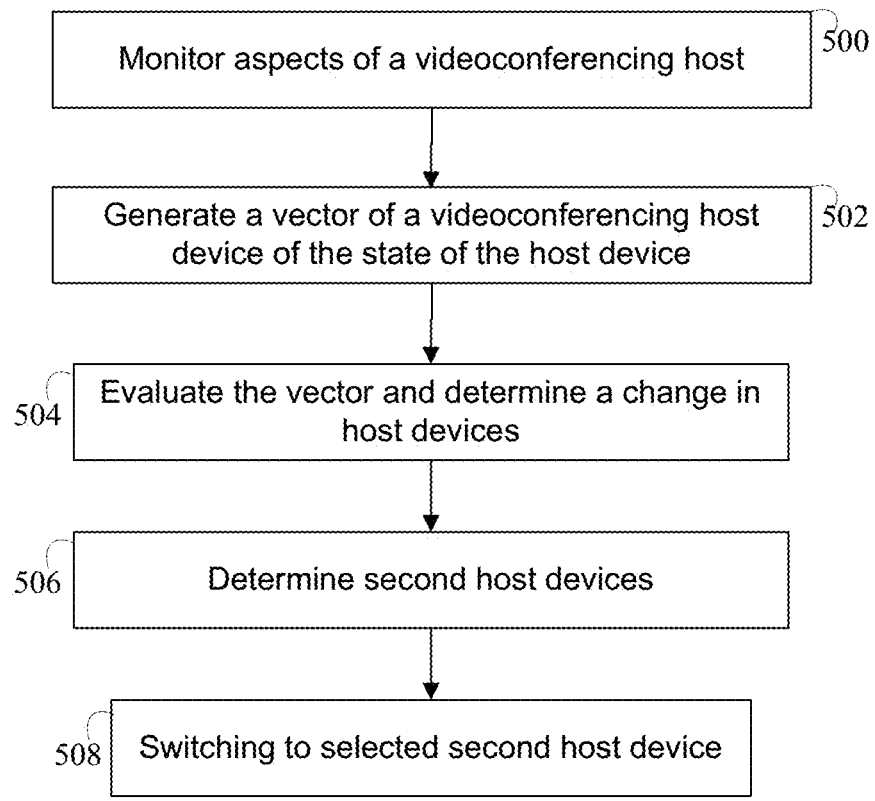
FIG. 5 is a flow chart illustration of an embodiment of the present invention.

FIG. 5 illustrates one embodiment of a method of the present invention for videoconferencing dynamic host control. At 500, the configured processor monitors the host device 402. The host device 402 controls the audio and the video distributed for the videoconference. The monitoring creates values at periodic time intervals which represent monitored aspects of the host device 402. The monitored values can include values for the host network connectivity, the host interruptions, the estimated time remaining of power, the quality metric of the video and audio transmitted by the host device 402, and combinations thereof.

At 502, the configured processor generates a vector value representing the state of the host device 402 hosting the videoconference attended by the participant videoconference devices 406. The vector value represents the state of the host device 402 during the videoconference according to the monitored values at a time L. The vector value can include the host network connectivity value indicative of a quality of connection for distributing the video and audio between the host device and the participant devices, the number of host interruptions during the videoconference, the estimated time remaining before a power level of the host device 402 is insufficient to control the video and audio, the host quality metric of the video and audio distributed to the participant videoconference devices 406, the history 416 of the host device 402 as a host device hosting prior videoconferences, and combinations thereof.

At 504, the configured processor evaluates the generated vector value and determines a change in vector value exceeding a threshold. The determined change in hosts can include a probability of a change and an expected time of change. The machine learning model 418 inputs the vectors and can generate the probability of a change, the expected time of change and combinations thereof.

At 506, the configured processor identifies a plurality of the second host devices 420 that are each enabled to control the audio and video distributed for the videoconference to others of the participant videoconference devices 406. The identification can include classifying the participants videoconference devices 406 into candidate hosts and non-candidate hosts and evaluate the suitability of the device of each of the candidate hosts for suitability as a new host. The identification can include evaluating the second vector $V2_i$ for each of the second host devices 420. The evaluation can include generating a list of the suitable host devices and ranking the list of suitable host devices. The evaluation can include sending the list or ranked list to the current host device, i.e. host device 402.

At 508, in response to the determined change that vector value $V_i$ exceeds a threshold, the configured processor switches the videoconference host to one of the second host devices 420. The switch changes the video and audio transmitted from the host device 402 and distributed to the participants to video and audio transmitted from the selected one second host and distributed to participants in a same videoconference.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining a frequency of interruptions of a host device hosting a videoconference that is attended by a plurality of participant videoconference devices, wherein the host device controls audio and video distributed for the videoconference to others of the participant videoconference devices;
   determining a network connectivity speed and throughput value for the host device that is indicative of a quality of connection for distributing the videoconference audio and video between the host device and one of the other participant videoconference devices;
   estimating a time remaining for the host device before a power level of the host device is insufficient to control the audio and the video distributed for the videoconference to the participant videoconference devices;
   determining a quality metric for the host device as a function of measuring signal loss of the videoconference audio and video distributed to the others of the participant videoconference devices;
   generating a vector value for the host device representing a state of the host device as a function of the frequency of interruptions of the host device, the network connectivity speed and throughput value of the host device, the estimated time remaining for the host device and the quality metric of the host device;
   evaluating the host device vector value to determine a change in the host device vector value during the videoconference;
   identifying a plurality of second host devices of the plurality of participant videoconference devices that are each enabled to control the audio and video distributed for the videoconference to others of the participant videoconference devices; and
   in response to determining that the change in the host device vector value exceeds a threshold, switching control of the videoconference from the host device to a selected one of the second host devices that is ranked higher than remaining others of the second host devices as a function of respective vector values generated for each of the second host devices.

2. The method of claim 1, further comprising:
   determining network speed and throughput connectivity values for each of the second host devices that are indicative of a quality of connection for distributing the videoconference audio and video between each of the second host devices and one of the other participant videoconference devices;
   determining frequencies of interruptions for each of the second host devices during the videoconference;
   estimating times remaining before power levels of each of the second host devices are insufficient to control the audio and video distributed for the videoconference to the participant videoconference devices;
   determining quality metrics for each of the second host devices for the audio and video distributed for the videoconference to the others of the participant videoconference devices as a function of measuring signal loss of the videoconference audio and video; and
   generating each of the respective vector values of the second host devices to each represent respective states of the second host devices as a function of respective ones of the determined second host device frequencies of interruptions, the second host device network connectivity speed and throughput values, the second host device estimated times remaining, and the second host device quality metrics.

3. The method of claim 2, further comprising:
   monitoring notices displayed on a display device of the host device and alerts sounded by a speaker of the host device during the videoconference; and
   determining the frequency of interruptions of the host device during the videoconference as a function of incrementing a counter in response to each of said displayed notices and alerts sounded by the speaker of the host device during the videoconference.

4. The method of claim 2, further comprising:
   determining a power supply amount and a power consumption rate of the host device; and
   determining the estimated time remaining before the power level of the host device is insufficient to control the audio and video distributed for the videoconference to the participant videoconference devices as a function of a scheduled end of the videoconference, the power supply, and the power consumption.

5. The method of claim 2, further comprising:
   identifying the plurality of second host devices in response to determining that information of respective participant inputs to access the videoconference by each of the second host devices originate from a same domain of the host device.

6. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer readable storage medium via the computer readable memory and thereby performs the determining the frequency of interruptions of the host device, the determining the network connectivity value for the host device, the estimating the time remaining for the host device, the determining the quality metric for the host device, the generating the vector value representing the state of the host device hosting the videoconference, the evaluating the host device vector value to determine the change in the host device vector value during the videoconference, the identifying the plurality of second host devices of the plurality of participant videoconference devices, and the switching control of the videoconference from the host device to the selected one of the second host devices.

7. The method of claim 6, wherein the computer-readable program code is provided as a service in a cloud environment.

8. A computer system comprising:
   a computer processor;
   a computer readable memory in circuit communication with the computer processor; and a computer readable storage medium in circuit communication with the computer processor;
wherein the computer processor executes program instructions stored on the computer readable storage medium via the computer readable memory and thereby:
determines a frequency of interruptions of a host device hosting a videoconference that is attended by a plurality of participant videoconference devices, wherein the host device controls audio and video distributed for the videoconference to others of the participant videoconference devices;
determines a network connectivity speed and throughput value for the host device that is indicative of a quality of connection for distributing the videoconference audio and video between the host device and one of the other participant videoconference devices;
estimates a time remaining for the host device before a power level of the host device is insufficient to control the audio and the video distributed for the videoconference to the participant videoconference devices;
determines a quality metric for the host device as a function of measuring signal loss of the videoconference audio and video distributed to the others of the participant videoconference devices;
generates a vector value for the host device representing a state of the host device as a function of the frequency of interruptions of the host device, the network connectivity speed and throughput value of the host device, the estimated time remaining for the host device and the quality metric of the host device;
evaluates the host device vector value to determine a change in the host device vector value during the videoconference;
identifies a plurality of second host devices of the plurality of participant videoconference devices that are each enabled to control the audio and video distributed for the videoconference to others of the participant videoconference devices; and
in response to determining that the change in the host device vector value exceeds a threshold, switches control of the videoconference from the host device to a selected one of the second host devices that is ranked higher than remaining others of the second host devices as a function of respective vector values generated for each of the second host devices.

9. The system of claim 8, wherein computer processor executes program instructions stored on the computer readable storage medium via the computer readable memory and thereby:
determines network connectivity speed and throughput values for each of the second host devices that are indicative of a quality of connection for distributing the videoconference audio and video between each the second host devices and one of the other participant videoconference devices;
determines frequencies of interruptions for each of the second host devices during the videoconference;
estimates times remaining before a-power levels of each of the second host devices are insufficient to control the audio and video distributed for the videoconference to the participant videoconference devices;
determines quality metrics for each of the second host devices for the audio and video distributed for the videoconference to the others of the participant videoconference devices as a function of measuring signal loss of the videoconference audio and video; and generates each of the respective vector values of the second host devices to each represent respective states of the second host devices as a function of respective ones of the determined second host device frequencies of interruptions, the second host device network connectivity speed and throughput values, the second host device estimated times remaining, and the second host device quality metrics.

10. The system of claim 9, wherein the computer processor executes program instructions stored on the computer readable storage medium via the computer readable memory and thereby:
monitors notices displayed on a display device of the host device and alerts sounded by a speaker of the host device during the videoconference; and
determines the frequency of interruptions of the host device during the videoconference as a function incrementing a counter in response to each of said displayed notices and alerts sounded by the speaker of the host device during the videoconference.

11. The system of claim 9, wherein the computer processor executes program instructions stored on the computer readable storage medium via the computer readable memory and thereby:
determines a power supply amount and a power consumption rate of the host device; and
determines the estimated time remaining before the power level of the host device is insufficient to control the audio and video distributed for the videoconference to the participant videoconference devices as a function of a scheduled end of the videoconference, the power supply, and the power consumption.

12. The system of claim 8, wherein the computer processor executes program instructions stored on the computer readable storage medium via the computer readable memory and thereby:
identifies the plurality of second host devices in response to determining that information of respective participant inputs to access the videoconference by each of the second host devices originate from a same domain of the host device.

13. A computer program product comprising:
a computer readable storage medium having computer readable program code embodied therewith, the computer readable program code comprising instructions for execution by a computer processor that causes the computer processor to:
determine a frequency of interruptions of a host device hosting a videoconference that is attended by a plurality of participant videoconference devices, wherein the host device controls audio and video distributed for the videoconference to others of the participant videoconference devices;
determine a network connectivity speed and throughput value for the host device that is indicative of a quality of connection for distributing the videoconference audio and video between the host device and one of the other participant videoconference devices;
estimate a time remaining for the host device before a power level of the host device is insufficient to control the audio and the video distributed for the videoconference to the participant videoconference devices;
determine a quality metric for the host device as a function of measuring signal loss of the videoconference audio and video distributed to the others of the participant videoconference devices;

generate a vector value for the host device representing a state of the host device as a function of the frequency of interruptions of the host device, the network connectivity speed and throughput value of the host device, the estimated time remaining for the host device and the quality metric of the host device;

evaluate the host device vector value to determine a change in the host device vector value during the videoconference;

identify a plurality of second host devices of the plurality of participant videoconference devices that are each enabled to control the audio and video distributed for the videoconference to others of the participant videoconference devices; and in response to determining that the change in the host device vector value exceeds a threshold, switch control of the videoconference from the host device to a selected one of the second host devices that is ranked higher than remaining others of the second host devices as a function of respective vector values generated for each of the second host devices.

14. The computer program product of claim 13, wherein the instructions for execution by the computer processor further causes the computer processor to:

determine network connectivity speed and throughput values for each of the second host devices that are indicative of a quality of connection for distributing the videoconference audio and video between each of the second host devices and one of the other participant videoconference devices;

determine frequencies of interruptions for each of the second host devices during the videoconference;

an estimate times remaining before a-power levels of each of the second host devices are insufficient to control the audio and video distributed for the videoconference to the participant videoconference devices;

determine quality metric s for each of the second host devices for the audio and video distributed for the videoconference to the others of the participant videoconference devices as a function of measuring signal loss of the videoconference audio and video; and generate each of the respective vector values of the second host devices to each represent respective states of the second host devices as a function of respective ones of the determined second host device frequencies of interruptions, the second host device network connectivity speed and throughput values, the second host device estimated times remaining, and the second host device quality metrics.

15. The computer program product of claim 14, wherein the instructions for execution by the computer processor further causes the computer processor to:

monitor notices displayed on a display device of the host device and alerts sounded by a speaker of the host device during the videoconference; and determining the frequency of interruptions of the host device during the videoconference as a function of incrementing a counter in response to each of said displayed notices and alerts sounded by the speaker of the host device during the videoconference.

16. The computer program product of claim 14, wherein the instructions for execution by the computer processor further causes the computer processor to:

determine a power supply amount and a power consumption rate of the host device; and determine the estimated time remaining before the power level of the host device is insufficient to control the audio and video distributed for the videoconference to the participant videoconference devices as a function of a scheduled end of the videoconference, the power supply, and the power consumption.

17. The computer program product of claim 13, wherein the instructions for execution by the computer processor further causes the computer processor to:

identify the plurality of second host devices in response to determining that information of respective participant inputs to access the videoconference by each of the second host devices originate from a same domain of the host device.

\* \* \* \* \*